United States Patent [19]

Kehrle

[11] 4,202,223
[45] May 13, 1980

[54] APPARATUS FOR REMOVING AN EXPOSED ROLL OF FILM FROM A CAMERA

[76] Inventor: Wolfgang Kehrle, Hauptstrasse 78, Aulendorf, Fed. Rep. of Germany

[21] Appl. No.: 880,465

[22] Filed: Feb. 23, 1978

[30] Foreign Application Priority Data

Mar. 5, 1977 [DE] Fed. Rep. of Germany ....... 2709638

[51] Int. Cl.² ............................ B25B 9/00; B25F 1/00
[52] U.S. Cl. ............................................. 81/3 R; 7/170
[58] Field of Search ................... 7/125, 170; 81/3 R, 81/3.8, 5.1 R, 43, 302, 425 A; 294/3, 106

[56] References Cited

U.S. PATENT DOCUMENTS

| | | | |
|---|---|---|---|
| 2,430,544 | 11/1947 | Walker | 81/3.8 |
| 2,601,795 | 7/1952 | Maxey et al. | 81/3 R |
| 2,608,116 | 8/1952 | Kulp | 81/5.1 R |
| 3,215,006 | 11/1965 | Urani | 81/3.8 |
| 3,808,915 | 5/1974 | Bonnel, Sr. | 81/5.1 R |

*Primary Examiner*—James G. Smith
*Attorney, Agent, or Firm*—McGlew and Tuttle

[57] ABSTRACT

An apparatus for removing a roll of film on a spool from a camera comprising, a top tong arm having a top grip portion and a top handle portion, and a bottom tong arm pivotally mounted to the top tong arm and having a bottom grip portion and a bottom handle portion. The top and bottom grip portions define a film roll engagement mouth which is openable and closable by moving the bottom handle portion against the top handle portion. At least one of the top and bottom grip portions include lateral guide faces for laterally retaining the spool in the film roll engagement mouth. A biasing spring may be positioned between the top and bottom handle portions for urging the top and bottom grip portions toward each other to firmly retain a roll of film within the film roll engagement mouth. A tensioning lever or knob may be provided which may be engaged with the spool when the roll of film and spool are engaged in the film engagement mouth, for rotating the spool and tightening the film thereon. A device for taping the end of the roll of film may be mounted on the top tong arm for dispensing tape in the vicinity of the film engagement mouth which can be utilized to seal the roll of film closed.

10 Claims, 4 Drawing Figures

APPARATUS FOR REMOVING AN EXPOSED ROLL OF FILM FROM A CAMERA

BACKGROUND OF THE INVENTION

1. Field of the Invention

This invention relates in general to devices for removing film from a camera and, in particular, to a new and useful apparatus for removing a roll of exposed film on a spool from the magazine of a camera in a single and reliable manner.

2. Description of the Prior Art

Many studio cameras in use today are equipped with a magazine into which two film spools are inserted and mounted for rotation to transport film within the camera. When a roll of film is exposed, it is wound up on one of the spools so that it may be removed from the camera magazine. An end flap projects from the film to avoid unwinding. To remove the film from the camera magazine the manual operation is required whereby a photographer or other individual grasps the roll of film on its spool and manually removes it from the camera magazine. A problem which often occurs is that, through clumsy handling or inadvertence, the film is dropped and thereby unrolled which exposes the film to the light and thereby ruins it. This most often occurs when the photographer is attempting to tighten the film on its spool by grasping the end flap and rotating the spool. The destruction of possibly invaluable film then results, and may lead to irreparable damage.

Another consideration in the removal of a roll of film is that a photographer must be careful not to handle the film surface excessively, and this natural caution further may lead to the dropping and ruining of the film.

SUMMARY OF THE INVENTION

It is an object of the present invention to provide a device for removing an exposed roll of film from the magazine of a camera in a reliable manner to avoid the aforementioned difficulties. The device can be utilized to remove the roll of film in a simple manner and with the film retained in a tightly wound position. The device may also be provided with a tensioning lever or knob that can be engaged with an end of the spool to rotate the spool and tighten the film on the roll. This tightening is required to form a close association between the layers of film on the roll and prevent any light from entering this space and exposing the film.

The device comprises top and bottom tong arms which each include a forward top and bottom grip portion respectively, and a rearward top and bottom handle portion. The top and bottom tong arms are mounted to each other and can be articulated with respect to each other to open and close a film engagement mouth formed between the top and bottom grip portions. At least one of the grip portions is provided with lateral guide faces for laterally retaining the spool with its roll of film when it is engaged in the film engagement mouth.

In a further development of the invention, the top and bottom grip portions may be in the shape of a curve having an inner face with a preferable radius arc corresponding to the radius of the film roll. Either one or both of the grip portions may also be designed in the form of a fork and one of the grip portions may be in the form of a thin curved member which may be easily slid between the film roll and the magazine of the camera.

The lateral guide faces on at least one of the grip portions may be of a width sufficient to closely fit between two flanges of the film spool and thereby laterally retain the film and film spool. The grip portions may also be of a size sufficient to at least partially embrace the roll of film so as to insure a reliable engagement between the device and the film. A biasing means in the form of a compression spring may also be provided between the handle portions of the top and bottom tong arms in order to bias the handle portions away from each other and urge the top and bottom grip portions toward each other to closely engage the film roll when it is within the film engagement mouth. The top tong arm may also be constructed in the form of a trough or in a U-shape, so that the bottom tong arm may be inserted therein. The top and bottom tong arms may then be pivotably mounted to each other and the bottom handle portion may be pivoted into the U-shaped top handle portion against the bias of the compression spring. A tensioning lever or knob may also be provided on one of the tong arms, and pivotably mounted so that it may be pivoted toward an end of the film spool after the spool is engaged in the film engagement mouth. The tensioning lever or knob may then be rotated to tighten the film roll on the film spool in order to closely associate the film layers on the roll to prevent the entrance of light therebetween. A gluing or taping device may also be provided on one of the tong arms for gluing or taping the end of the roll of film thereby sealing the roll and prevent its being unraveled. Such a construction can be provided on a pivotable arm or a displaceable lever which includes a roll of adhesive tape, which displaceable lever can be pivoted toward the roll of film so that a length of tape can be applied to the roll thereby sealing it.

The apparatus may be constructed from injection molded plastic parts thereby providing an apparatus which is simple in design, rugged in construction and economical to manufacture. The apparatus can be utilized by unskilled personnel to extract a roll of exposed film from a camera in a manner which provides a reliable and secure engagement between the apparatus and the roll of film to prevent the prior art difficulties.

Accordingly an object of the present invention is to provide an apparatus for removing a roll of film on a spool from a camera, comprising, a top tong arm having a top grip portion and a top handle portion, a bottom tong arm having a bottom grip portion and a bottom handle portion movably mounted on said top tong arm, said top and bottom grip portions defining a film roll engagement mouth which is openable and closable by moving said bottom handle portion in respect to said top handle portion, and at least one of said top and bottom grip portions including lateral guide faces for preventing any lateral displacement of the spool in said film roll engagement mouth.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
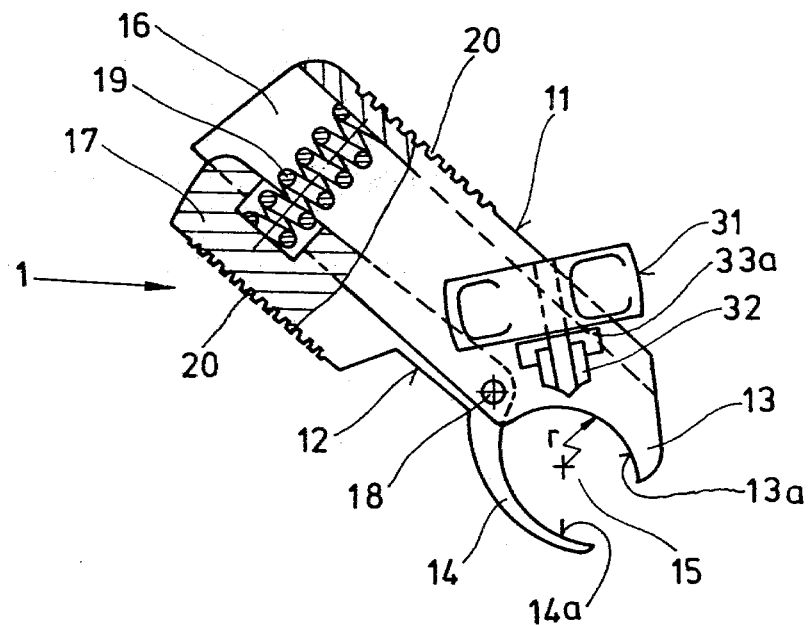
FIG. 1 is a side elevational view of an apparatus constructed in accordance with the invention.

Referring to the drawings in particular, the invention embodied therein in FIG. 1, comprises an apparatus for removing a roll of film on a spool from the magazine of a camera generally designated 1 which includes a top tong arm generally designated 11 having a forward grip portion 13 and a rearward handle portion 16. A bottom tong arm generally designated 12 is pivotally connected to the top tong arm 11 at a pivot joint 18. The bottom tong arm 12 includes a bottom grip portion 14 and a bottom handle portion 20. The pivot mounting 18 may be in the form of a hinge bolt to provide the relative pivotal movement between the top and bottom tong arms 11 and 12. Grip portions 13 and 14 face each other and define a film engagement mouth 15 therebetween. A compression spring 19 is disposed between the handle portions 16 and 17 to bias the handle portions away from each other and thereby bias the grip portions 13 and 14 toward each other to close the film engagement mouth 15. Handle portions 16 and 17 may be provided with knurlings 20 to insure a reliable grip when the apparatus is utilized by an operator.

Figure 2:
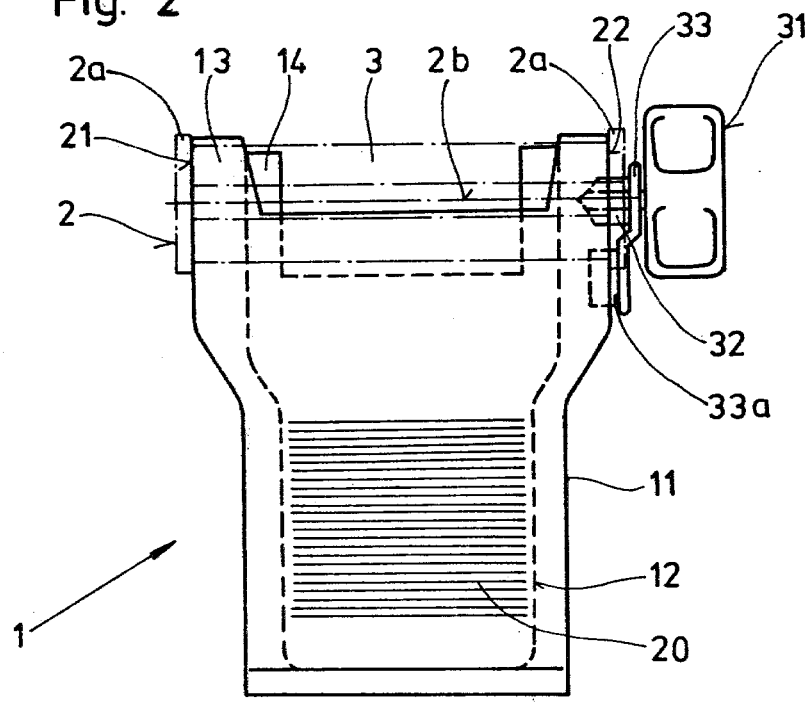
FIG. 2 is a top plan view of the embodiment of FIG. 1.

Referring now to FIG. 2, either the top or bottom grip portion may be provided with lateral guide faces 21 and 22 which are of a width equal to or slightly smaller than the inside space between flanges 2a of a film spool 2 on which an exposed film 3 is disposed. Spool 2, flanges 2a and film 3 are shown in dot-dash lines, and are shown engaged with the grip portions 13 and 14 within the film engagement mouth 15. The lateral guide faces 21 and 22 are provided to engage within the flange portions 2a of the spool 2 and prevent any lateral displacement of the spool 2 with the film 3 after it is retained within the apparatus. A reliable engagement between the apparatus and the film roll is further achieved by forming an inner surface 13a and 14a of the grip portions 13 and 14 respectively with a radius r, which is substantially equal to the radius of a roll of film 3 to be extracted from the magazine of the camera. The grip portions 13 and 14 may further be in the form of forks as shown in FIG. 2 and the grip portion 14 may be in the form of a thin curved member so as to be easily insertable in the space between an exposed roll of film and a camera magazine to facilitate the extraction of the film roll from the camera.

In operation a roll of exposed film 3 with its spool 2 may be extracted from the magazine of a camera by first grasping the handle portions 16 and 17 and squeezing them together against the biasing force of spring 19. Film engagement mouth 15 is then opened as the space between grip portions 13 and 14 increases. Bottom grip portion 14 may then be slid into the space between the film 3 and a camera magazine and the pressure exerted on the handle portions 16 and 17 released slightly to enable the biasing spring 19 to close the top and bottom grip portions around the exposed roll of film. With the engagement between the film and the device established the operator may remove the roll of film from the camera in a secure and reliable fashion. To facilitate the easy interaction of the top and bottom tong arms, the top tong arm may be formed in the shape of a U or a trough and the bottom tong arm may be provided of a size to easily slide within the trough or U shape of the top tong arm. After extracting the film roll from the camera, even if the entire device were to be dropped the roll of film 3 would be retained in a wound position since it is firmly held between the grip portions 13 and 14 by the tension of the biasing spring 19.

Figure 3:
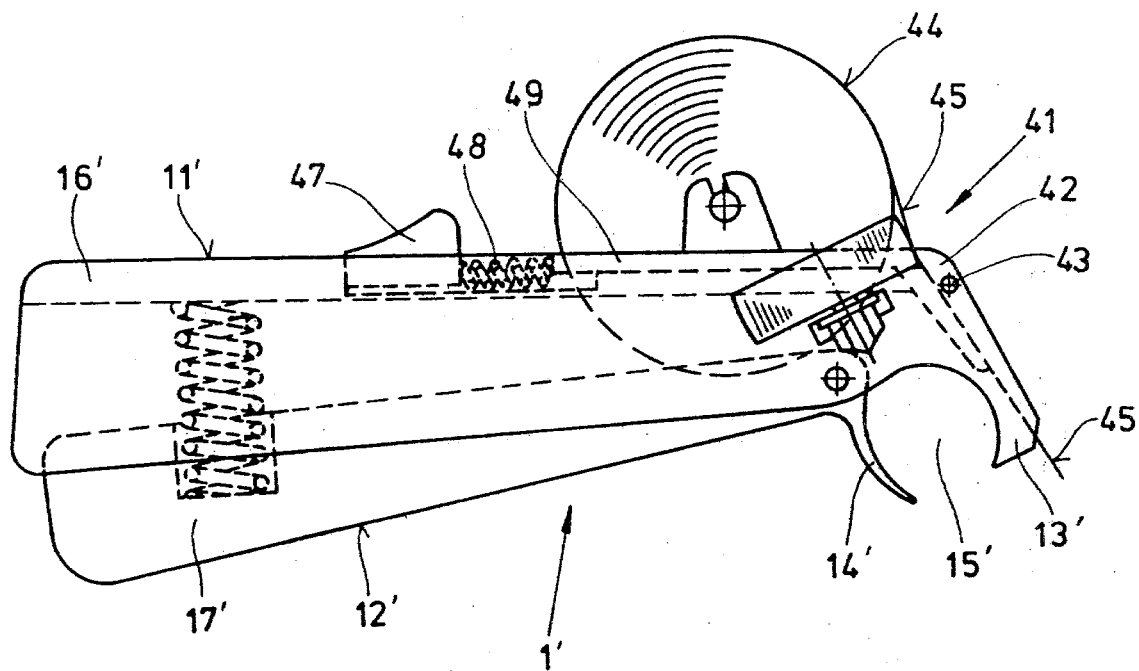
FIG. 3 is a side elevational view similar to FIG. 1 of another embodiment of the invention.
Figure 4:
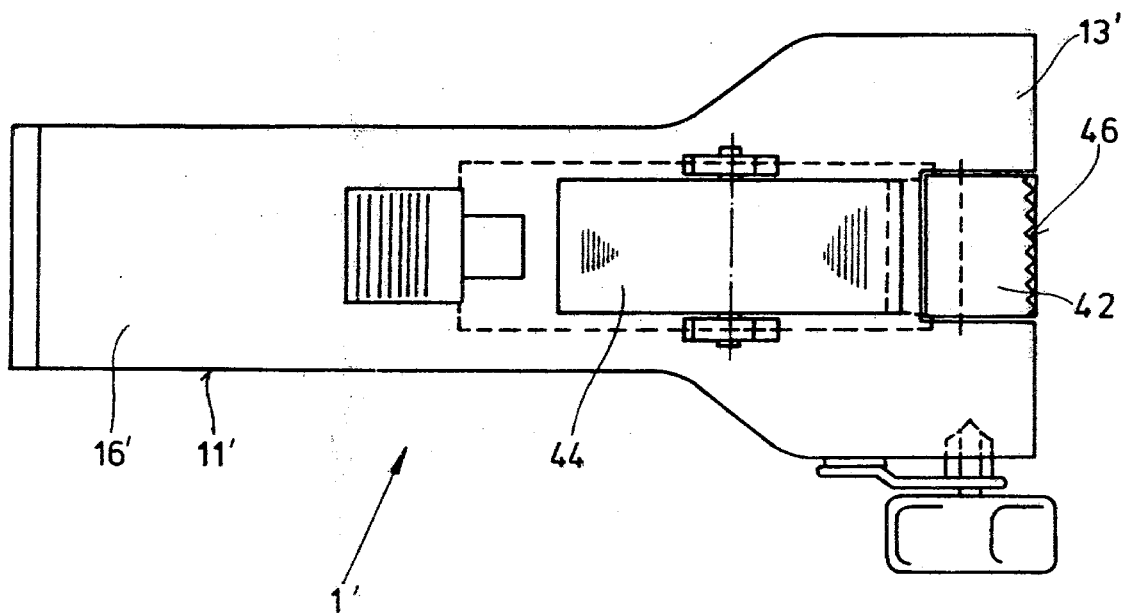
FIG. 4 is a top plan view of the embodiment of FIG. 3.

A tensioning lever or knob 31 may be provided on the apparatus for tightly rolling the film 3 on the spool 2, before or after the film is extracted from the magazine. As seen in FIGS. 1 and 2 the tensioning knob 31 is rotatably mounted on a mounting lever 33 which is pivotally connected to the top tong arm 11 at a pivot hinge 33a. FIG. 1 shows the tensioning knob in a position away from the film spool 2 and FIG. 2 shows the tensioning knob in a position engaged with the spool 2. A conical insert member 32 is provided on the tensioning knob 31 and may be engaged with a through hole 2b of the film spool 2. The film 3 being firmly engaged between the grip portions 13 and 14, the tensioning knob 31 may be rotated to cause a tight winding of the film 3 on the spool 2. As aforementioned this tight winding is necessary to form a close association between the adjacent levels of film on the film roll and prevent the admission of light. Referring now to FIGS. 3 and 4 another embodiment of the apparatus generally designated 1' is constructed in a similar manner with similar parts designated by similar numerals with the inclusion of a prime. The device of FIGS. 3 and 4 are provided with a gluing or taping means generally designated 41 for gluing or taping the end flap of the film 3 to securely close the roll of film on the spool 2. Gluing or taping means 41 comprises a roll of adhesive tape 44 for dispensing lengths of adhesive tape 45 which may be applied to a film roll 3. Tape roll 44 is rotatably mounted on the top tong arm 11' and tape 45 is guided through a tape arm 42. Tape arm 42 is pivotally mounted at pivot joint 43 onto upper tong arm 11'. A slide portion 47 is slidably engaged with the top tong arm 11' and may be slid against a ram 49 through a spring 48. Ram 49 presses against the top portions of tape arm 42 thereby rotating tape arm 42 and displacing tape 45 against the roll of film 3 now shown in FIG. 3. A length of tape 45 may then be cut from the roll 44 by use of serrated edge 46 which is provided on the top tong arm 11'. In this manner the film 3 may be firmly sealed to insure its retention in a rolled position.

While specific embodiments of the invention have been shown and described in detail to illustrate the application of the principles of the invention, it will be understood that the invention may be embodied otherwise without departing from such principles.

What is claimed is:

1. An apparatus for removing a roll of film on a film spool having side flange portions from a camera comprising, a top tong arm having a top grip portion and a top handle portion, a bottom tong arm movably mounted on said top tong arm having a bottom grip portion and a bottom handle portion, said top and bottom grip portions defining a film roll engagement mouth which is openable and closeable by moving said bottom handle portion in respect to said top handle portion, said film engagement mouth being openable to admit a roll of film on a film spool and closeable to closely engage around the roll of film, at leat one of said top and bottom grip portions including spaced apart lateral guide faces respectively engageable with the film spool side flange portions for preventing lateral displacement of the film spool when the roll of film on the film spool is engaged in said film roll engagement mouth, and tensioning knob mounted for rotation on one of said top and bottom grip portions engageable with the film spool for rotating the film spool when the film is embraced between said top and bottom guide portions to tightly wind the film on the spool, said tensioning knob being pivotably connected to said one of said top and bottom tong arms to swing into and out of engagement with the film spool.

2. An apparatus according to claim 1, wherein said top and bottom grip portions include curved surfaces facing inwardly toward said film engagement mouth and curved with a radius substantially equal to the radius of the roll of film on its film spool.

3. An apparatus according to claim 1, wherein at least one of said top and bottom grip portions are in the form of a fork.

4. An apparatus according to claim 1, wherein at least one of said top and bottom grip portions are in the form of a thin curved member.

5. An apparatus according to claim 1, wherein said top and bottom grip portions are of a length sufficient to embrace around at least a portion of a roll of film.

6. An apparatus according to claim 1, wherein said bottom tong arm is pivotally mounted to said top tong arm at a location between said top and bottom handle portions and said top and bottom grip portions, and including biasing means disposed between said top and bottom handle portions for biasing the top and bottom handle portions away from each other and said top and bottom grip portions toward each other.

7. An apparatus according to claim 1, wherein said top tong arm is in the form of a trough and said bottom tong arm is of a size sufficient to partially fit within said trough and is pivotably mounted to said top tong arm at a location between said top and bottom handle portions and said top and bottom grip portions.

8. An apparatus for removing a roll of film on a film spool from a camera comprising, a top tong arm having a top grip portion and a top handle portion, a botto tong arm movably mounted on said top tong arm having a bottom grip portion and a bottom handle portion, said top and bottom grip portions defining a film roll engagement mouth which is openable and closable by moving said bottom handle portion in respect to said top handle portion, said film engagement mouth being openable to admit a roll of film on a film spool and closable to closely engage around the roll of film, and at least one of said top and bottom grip portions including lateral guide faces engageable with the film spool for preventing lateral displacement of the film spool when the roll of film on the film spool is engaged in said film roll engagement mouth, and gluing means connected to one of said top and bottom grip portions for gluing an end of the film on the film spool to the rest of the roll of film to seal the roll of film in a rolled condition.

9. An apparatus according to claim 8, wherein said gluing means comprises a tape arm pivotably mounted to said top tong arm adjacent said top grip portion for guiding an adhesive tape into the vicinity of said film engagement mouth, a ram slidably mounted on said top tong arm and engageable with said tape arm, a slide member slidably mounted on said top tong arm, and a spring connected between said slide member and said ram, said slide member being slidable toward said tape arm to push said ram through said spring and pivot said tape arm to bring the tape therein into close association with said film engagement mouth to tape an end of film on a roll of film held in said film engagement mouth closed.

10. An apparatus for removing a roll of film on a film spool from the magazine of the camera comprising, a top tong arm having a top grip portion and a top handle portion, a bottom tong arm pivotably mounted on said top tong arm having a bottom grip portion facing said top grip portion and a bottom handle portion juxtaposed with said top handle portion, said top and bottom handle portions being displaceable toward each other to open the spacing between said top and bottom grip portions, biasing means disposed between said top and bottom handle portions for biasing said top and bottom handle portions away from each other and the top and bottom grip portions toward each other, said top and bottom grip portions being curved and of a length sufficient to engage around the major portion of a roll of film on a film spool, a mounting lever pivotally connected to said top tong arm, a tensioning knob rotatably mounted on said mounting lever, said mounting lever being pivotable toward a film spool retained between said top and bottom grip portions to engage said tensioning knob with the spool and said tensioning knob being rotatable to tightly wind the film on the film spool, and gluing means connected to said top tong arm for sealing an end of the roll of film on the film spool.

* * * * *